(12) United States Patent
Sakai et al.

(10) Patent No.: US 7,763,215 B2
(45) Date of Patent: Jul. 27, 2010

(54) REACTOR HAVING DETACHABLY FIXED TUBESHEET PLATE MEMBER

(75) Inventors: Kenji Sakai, Chiba (JP); Yasuhiko Kojima, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 724 days.

(21) Appl. No.: 11/240,460

(22) Filed: Oct. 3, 2005

(65) Prior Publication Data

US 2006/0073086 A1 Apr. 6, 2006

(30) Foreign Application Priority Data

Oct. 1, 2004 (JP) ............... 2004-290258

(51) Int. Cl.
*B01J 8/00* (2006.01)
(52) U.S. Cl. .................... 422/187; 422/198; 422/202; 422/240; 165/157; 165/145
(58) Field of Classification Search ................. 422/187, 422/198, 202, 240; 165/157, 145, 133
See application file for complete search history.

(56) References Cited

U.S. PATENT DOCUMENTS

| | | | | |
|---|---|---|---|---|
| 3,704,690 A | * | 12/1972 | Mevenkamp | ................ 122/7 R |
| 4,071,083 A | * | 1/1978 | Droin | ..................... 165/173 |
| 4,231,696 A | * | 11/1980 | Rieben | ........................ 414/5 |
| 4,579,087 A | * | 4/1986 | Stol et al. | ..................... 122/32 |
| 4,700,773 A | * | 10/1987 | Kehrer | ................... 165/134.1 |
| 4,704,994 A | * | 11/1987 | Hu et al. | ....................... 122/32 |
| 5,767,313 A | | 6/1998 | Jonckers | |
| 6,267,289 B1 | | 7/2001 | Miola | |
| 6,476,262 B2 | | 11/2002 | Fukunaka et al. | |
| 6,477,846 B2 | * | 11/2002 | Yundt, Jr. | ....................... 62/71 |
| 6,926,869 B2 | * | 8/2005 | Rizzi | .......................... 422/144 |
| 2004/0238161 A1 | * | 12/2004 | Al-Anizi et al. | .......... 165/134.1 |
| 2005/0040023 A1 | * | 2/2005 | Hino et al. | .................... 202/82 |

FOREIGN PATENT DOCUMENTS

| | | |
|---|---|---|
| EP | 0 155 735 A1 | 9/1985 |
| GB | 974590 | 11/1964 |
| GB | 1 508 836 | 4/1978 |
| JP | 2002-20360 | 1/2002 |
| WO | WO 03/095060 A1 | 11/2003 |

* cited by examiner

*Primary Examiner*—N. Bhat
(74) *Attorney, Agent, or Firm*—Oblon, Spivak, McClelland, Maier & Neustadt, L.L.P.

(57) ABSTRACT

A reactor including a reactor vessel and heat exchange tubes provided in the reactor vessel. The reactor vessel includes a tubesheet and is configured to receive a reaction fluid. The tubesheet has a first plate member configured to contact the reaction fluid and a second plate member configured to not contact the reaction fluid. Heat exchange tubes are provided in the reactor vessel and fixed to the first plate member. The heat exchange tubes are configured to receive a heat exchange medium. At least a portion of the first plate member configured to contact the reaction fluid is made of a metal that has a high corrosion-resistance against the reaction liquid, and the second plate member is made of a metal that has a low corrosion-resistance against the reaction liquid. The second plate member is detachably fixed to a remainder of the reactor vessel.

17 Claims, 6 Drawing Sheets

REACTOR HAVING DETACHABLY FIXED TUBESHEET PLATE MEMBER

BACKGROUND

1. Field of the Invention

The present invention relates to a reactor having a structure wherein heat exchange tubes for flowing a heat medium for cooling or heating are provided in a reactor vessel and the heat exchange tubes are connected to a tubesheet, and the reactor vessel contains a corrosive reaction fluid in the inside thereof. Especially, the present invention relates to a reactor for urea condensing and synthesis which contains a mixed gas including ammonia and carbon dioxide.

2. Background of the Invention

Well-known methods of producing urea include reacting ammonia and carbon dioxide in a synthesis reactor at a urea synthesis pressure and urea synthesis temperature, separating unreacted ammonium carbamate (an intermediate product in the urea synthesis) as a gas mixture of ammonia and carbon dioxide from the obtained urea synthesis mixture, condensing and recycling the gas mixture to the urea synthesis zone, and obtaining a urea solution from the urea synthesis mixture from which the ammonium carbamate and the like have been removed. Various proposals have been made recently regarding such methods in order to realize a more economical urea plant. Such proposals include reducing the number of equipment in a high-pressure synthesis loop of a urea plant, and the total equipment volume, the installation area, and the height of the plant by developing a condensation and synthesis reactor in which an apparatus for condensing the gas mixture, which includes ammonia and carbon dioxide gas, and an apparatus for urea synthesis are integrated.

Patent Document 1 (Japanese Patent Laid-Open No. 2002-20360) and the corresponding Patent Document 2 (U.S. Pat. No. 6,476,262) describe combining a condenser and a synthesis reactor, which were conventionally provided as separate pieces of equipment, by arranging a tube bundle for cooling over the middle portion to bottom portion of a vertical synthesis reactor. A gas mixture including unreacted ammonia and carbon dioxide gas and an absorbing medium are introduced from the bottom portion of the reactor, and feedstock ammonia is supplied to the bottom and the middle portions of the reactor. The reaction heat of ammonium carbamate formation (ammonium carbamate is an intermediate product) is removed by cooling by way of the tube bundle, thereby promoting condensation of the gas mixture, whereby the synthesis reaction is made to further progress over the middle portion to top portion of the synthesis reactor.

Patent Document 3 (U.S. Pat. No. 5,767,313) describes combining the condenser and the synthesis reactor, which were conventionally provided as separate pieces of equipment, by arranging a tube bundle for cooling on one side of a horizontal condensation and synthesis reactor. Feedstock ammonia is introduced from the side on which the tube bundle is provided so that the feedstock ammonia successively flows through many baffles to the side opposite the tube bundle, a gas mixture is flowed including unreacted ammonia and carbon dioxide gas from the bottom of the entire reactor so that the gas mixture mainly condensates at the tube bundle, and further carrying out the synthesis reaction in the remaining portion of the reactor.

Patent Document 4 (European Patent No. 0155735) describes an apparatus in which the condenser and the synthesis reactor are not completely combined. But this apparatus is the same as described in Patent Document 3 in that a synthesis reaction is also started at the condenser in addition to condensation of the gas mixture.

In general, a urea synthesis mixture containing ammonium carbamate, which is an intermediate product in urea synthesis, is extremely corrosive to metals. For that reason, for the equipment used in urea synthesis loop (e.g., the synthesis reactor, condenser and stripper), the parts that come into contact with the urea synthesis solution are all made of a corrosion-resistant metal, such as high-chromium austenite steel, a dual-phase alloy, titanium or 316L austenite steel, which are corrosion-resistant to the urea synthesis mixture. On the other hand, because the required pressure for urea synthesis is high at about 12.5 MPaG to 35 MPaG (the "G" used in units of pressure refers to "gauge pressure"), the basic material for the pressure-resistant portions of the equipment is preferably carbon steel or low-alloy steel, which are economical and reliable. For this reason, methods have been employed until now wherein carbon steel or low-alloy steel is used for the pressure-resistant portions of the equipment in a urea synthesis loop and the inner surface of all the portions in contact with the urea synthesis mixture is lined with a corrosion-resistant metal.

Even in recently developed urea condensation and synthesis reactors, the material composition of the equipment body is basically the same as above. However, the urea condensation and synthesis reactor differs from the conventional art in that the tube bundle for cooling is inserted into a highly corrosive urea synthesis mixture, whereby the portion where the tubes are fixed to the tubesheet requires special consideration. That is, the tubes made of corrosion-resistant metal must be fixed by a full-penetration weld with no crevice to the corrosion-resistant metal side of the tubesheet (i.e. the side in contact with the urea synthesis mixture) which is formed of two materials, namely a corrosion-resistant metal and carbon steel or low-alloy steel. In practice, an inner bore weld in which the welding torch is inserted from the tube side (channel side) of the tubesheet may be employed as a practical welding method. This is because of the following two reasons.

In order to withstand the high pressure of urea synthesis pressure and resist corrosion from the urea synthesis mixture, the tubesheet for attaching the tube bundle is a plate in which carbon steel or low-alloy steel serves as a material for the pressure-resistant portion and a corrosion-resistant metal is put onto the interior portions of the equipment in contact with the urea synthesis mixture. Usually, deposit (overlay) welding is carried out using a corrosion-resistant metal onto the carbon steel or low-alloy steel of the pressure-resistant portions to fabricate a tubesheet in which two types of material have been combined. To attach a tube made of a corrosion-resistant metal to this tubesheet, a usual attaching method using an tube expanding or welding from the tube side (channel side) cannot be used, and it is necessary to attach the tube by directly welding to the corrosion-resistant metal layer of the tubesheet. This is because in usual methods in which the tube is attached to the tubesheet using an tube expanding or welding from the tube side, the corrosive urea synthesis mixture penetrates into the carbon steel or low-alloy steel portion, which serves as the pressure-resistant portion of the tubesheet, whereby the important pressure-resistant portion cannot be protected from corrosion.

High-chromium austenite steel (25Cr-22Ni-2Mo steel and the like), dual-phase alloys (25Cr-7Ni-3Mo steel and the like), titanium and 316L austenite steel are economical and often used as a corrosion-resistant material against urea synthesis mixtures. These materials form a passive film on the metal surface using dissolved oxygen in the urea synthesis mixture, thereby achieving corrosion resistance against the urea synthesis mixture. Therefore, if a narrow crevice exists on the surface of the metal, dissolved oxygen is not supplied to inside the crevice, whereby a passive film is not formed at that portion. This results in crevice-corrosion (i.e. only the crevice portion is selectively corroded). For this reason, the weld for welding the above-described tube to the corrosion-resistant metal layer of the tubesheet must employ a welding method which leaves no crevices on the urea synthesis mixture side.

SUMMARY OF THE INVENTION

When using a combined tubesheet comprised of two types of material, which is employed in the portion for attaching the tubes of a tube bundle to the tubesheet in a urea condensation and synthesis reactor, the following special considerations are required in the method for attaching a tube made of a corrosion-resistant metal to the corrosion-resistant-metal side of the tubesheet by way of inner-bore welding.

The weld for attaching the tubes to the tubesheet is difficult to perform, because access to the welding point is hard due to configuration of tubesheet. Further, once welded, repair welding defects, when repair is required, is not easy, because access to the welding defects hard due to existence of tubes already welded.

Figure 8:
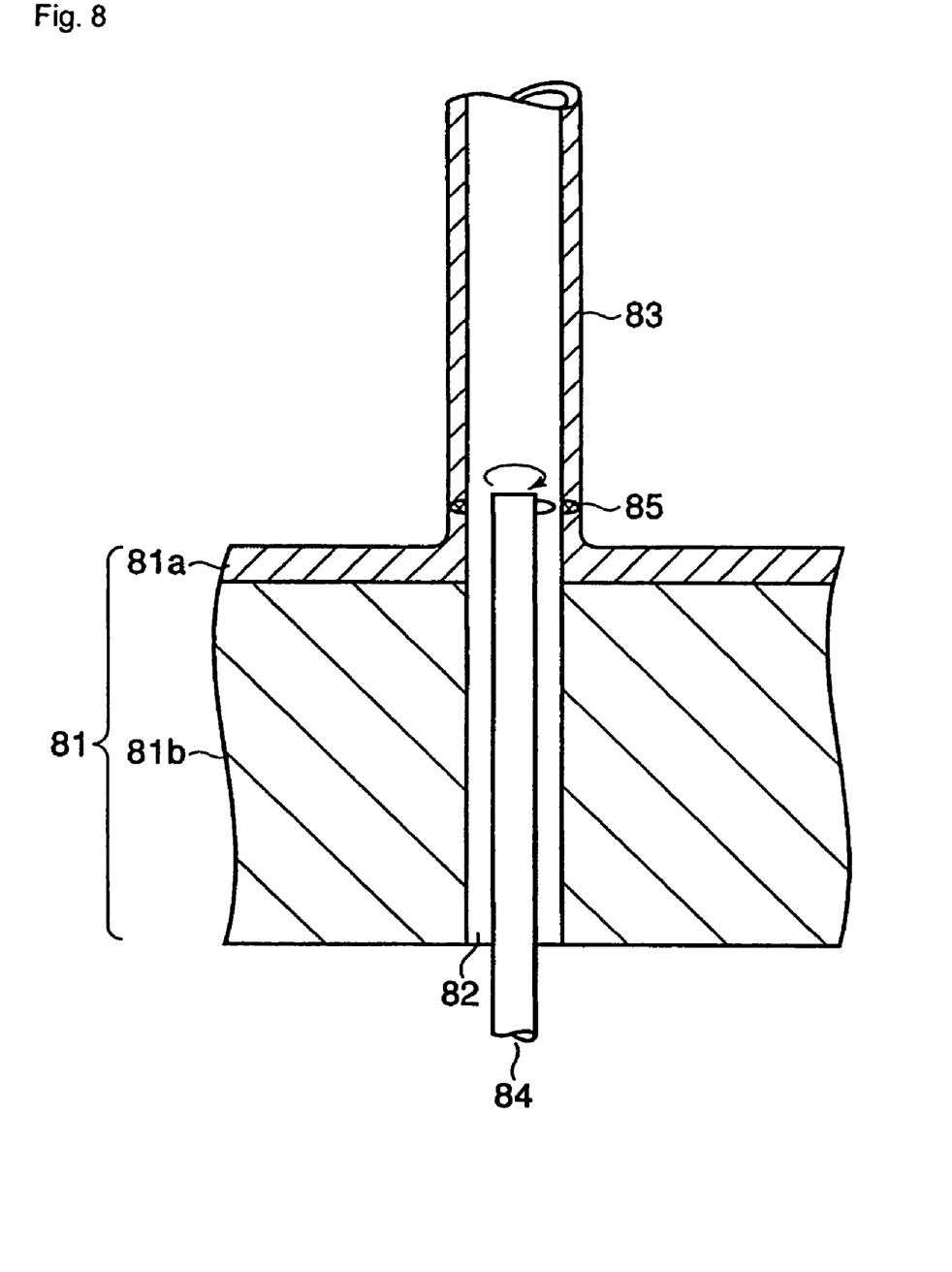
FIG. 8 is a schematic, diagram for explaining inner bore welding.

A urea condensation and synthesis reactor is a high-pressure equipment, in which the tubesheets are generally extremely thick. Depending on the equipment size and design conditions, the thickness may reach as much as 500 mm to 800 mm. As shown in FIG. 8, when carrying out inner bore welding, it is necessary to insert a long welding torch 84 from the tubesheet face of the tube side through a narrow tube hole 82 that is usually not more than 20 mm in diameter, to correctly set the torch position on the opposite side (shell side) of the extremely thick tubesheet 81, and to perform a sufficient penetration-weld without fault at the weld portion 85 of the tubesheet and tube 83. Such a welding process is not easy as it demands fairly high-caliber welding control. In addition, once welding and its subsequent inspection is completed, and after starting welding for the tube in the next row, it becomes extremely difficult from the tube-exterior to access tubes that were previously welded. In this case, if a defect is found in the weld portion of a tube whose welding has already been completed, there is basically no other option but to carry out repair work from the tube-interior side. Such a work must be carried out deep down on the opposite side (shell side) of an extremely thick tubesheet via a narrow hole of a tubesheet, which is very difficult.

After starting the operation of the reactor, maintenance of the weld portion which attaches a tube to the tubesheet is not easy.

Welding defects which were hidden in the welding portion 85 of the tube and tubesheet, or the overlay welding portion of a tubesheet (welding portion of the corrosion-resistant metal portion 81a on the pressure-resistant portion 81b), supposedly become apparent after starting the operation as a result of corrosion that occurs during operation, and leaks may occur from the urea synthesis mixture side to the tube side. Furthermore, defects in the heat exchange tube 83, which were hidden during tube manufacture, may become apparent after operation start-up as a result of the corrosion that occurs during operation, and leaks may occur from the urea synthesis mixture side to the tube side. When such a leak occurs, in most cases, welding repair work needs to be carried on the corrosion-resistant metal layer of the tubesheet from the tube side of the tubesheet through a long and narrow tube hole, or plug welding has to be used. However, as is also the case during manufacturing the reactor, such work is extremely difficult.

Further, no practical repair methods have been found for cases where a crack that has formed on the interface between the pressure-resistant portion of the tubesheet and the corrosion-resistant metal overlay layer penetrating through to the urea synthesis mixture side, or where the carbon steel or low-alloy steel portion of the tubesheet has been heavily damaged by corrosion of a urea synthesis mixture leak through to the tube side during operation.

Not only a urea condensation and synthesis reactor, but also other reactors may suffer from the same situation as those described above in case that the reactor has a heat-exchanger tube bundle for cooling or heating in its inside, and a tubesheet, to which the tube bundle is fixed, is formed of a material having higher corrosion resistance against the reaction fluid and a material having lower corrosion resistance against the reaction fluid.

Accordingly, the present invention advantageously provides a reactor, in particular a urea condensation and synthesis reactor in which tube-to-tubesheet joint portion is more reliable, in which it is easy to weld heat exchange tubes to a tubesheet, and in which maintenance of the reactor after starting the operation is easy.

The present invention provides a reactor comprising a reactor vessel and heat exchange tubes for flowing a heat medium for cooling or heating arranged in the reactor vessel. A portion of the reactor vessel is a tubesheet fixed to the remaining portion of the reactor vessel. The tubesheet has a first plate member arranged at a position in contact with reaction fluid which is to be contained in the reactor vessel and a second plate member arranged at a position not in contact with the reaction fluid. At least a portion in contact with the reaction fluid of the first plate member is made of a high corrosion-resistant metal which has relatively higher corrosion-resistance against the reaction liquid, and the second plate member includes a low corrosion-resistant metal which has relatively lower corrosion-resistance against the reaction liquid. The heat exchange tubes are fixed by a weld to the first plate member, the first plate member is fixed by a weld to the remaining portion of the reactor vessel, and the second plate member is detachably fixed to the remaining portion of the reactor vessel.

The above-described reactor is preferably a reactor for obtaining a urea synthesis mixture by reacting ammonia and carbon dioxide, where the above-described heat medium is a cooling medium and the above-described reaction fluid is a urea synthesis mixture.

The above-described high corrosion-resistant metal is preferably a metal selected from the group consisting of high-chromium austenite steel, dual-phase alloy, titanium and 316L austenite steel. The above-described low corrosion-resistant metal is preferably carbon steel or low-alloy steel. The above-described first plate member preferably consists of the high corrosion-resistant metal. The above-described second plate member is preferably thicker than the first plate member. The above-described heat exchange tubes are preferably welded to the first plate member by an inner bore weld.

According to the present invention, a reactor, in particular a urea condensation and synthesis reactor, is provided in which tube-to-tubesheet joint portion is more reliable, welding for attaching heat exchange tubes, such as cooling tubes, to the tubesheet is easy, and maintenance after starting the operation is easy.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

The present invention will now be further explained with reference to the drawings using a urea condensation and synthesis reactor as an example. However, the present invention is not intended to be limited thereto.

The present invention relates to a reactor having a structure wherein heat exchange tubes for flowing a heat medium for cooling or heating is provided in a reactor vessel and the heat exchange tubes are connected to a tubesheet, and the reactor vessel contains a corrosive reaction fluid in the inside thereof. In particular, the present invention relates to a urea condensation and synthesis reactor in which urea synthesis is integrated with the condensation of a gas mixture including ammonia and carbon dioxide gas.

Figure 1:
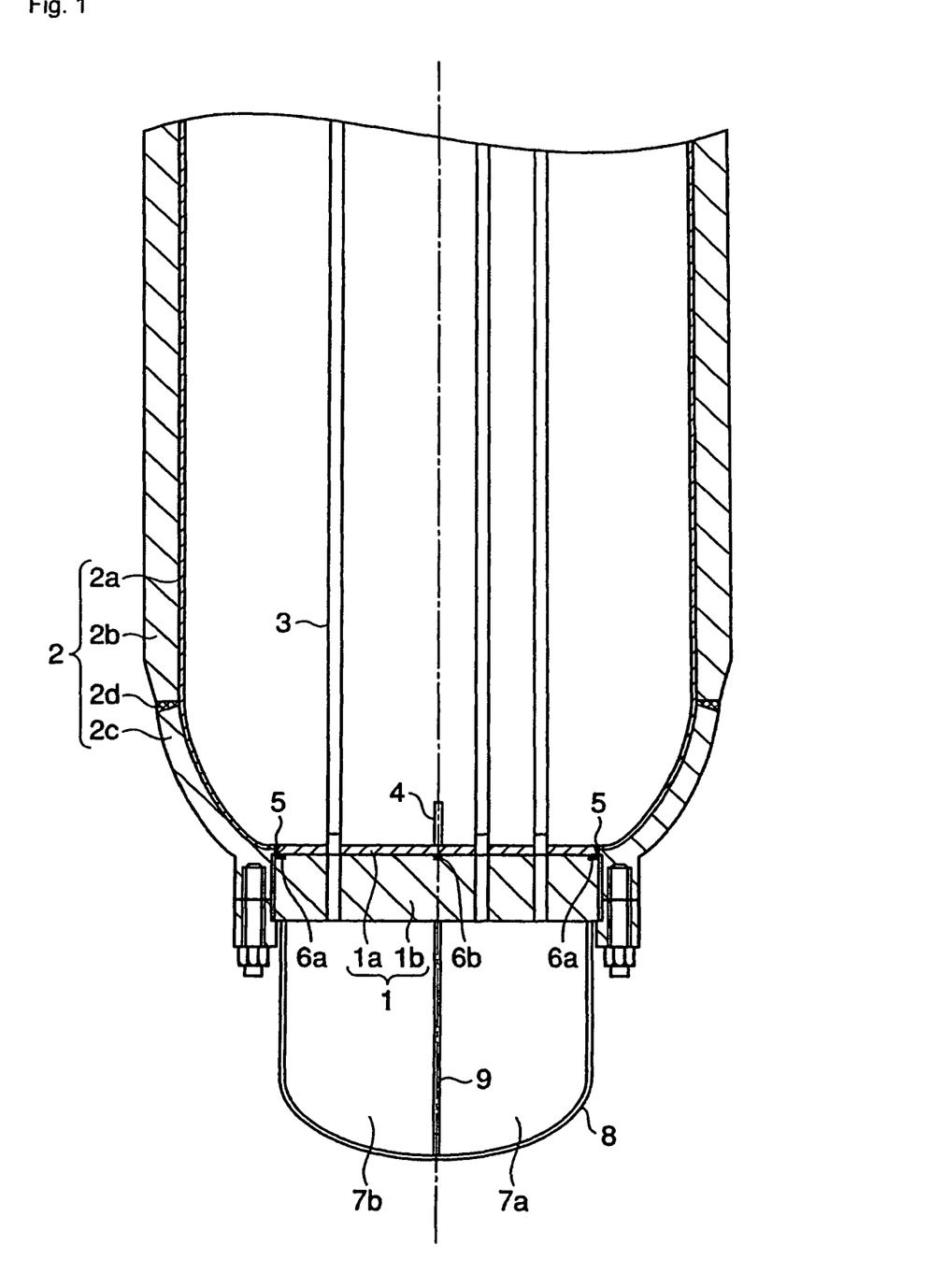
FIG. 1 is a schematic, cross-sectional view illustrating a part of a reactor according to the present invention.

FIG. 1 illustrates a cross-section of a lower portion of a vertical urea condensation and synthesis reactor. The upward direction in the drawings corresponds to vertically upward direction. A tubesheet 1 has a first plate member 1a and a second plate member 1b. The first plate member 1a mainly functions for corrosion-resistance against the urea synthesis mixture, and the second plate member 1b mainly functions for withstanding pressure of the urea synthesis reaction. Thus, the tubesheet is divided into two members that are functionally independent (i.e. they are not integrated). The urea synthesis mixture is a mixture of a gas mixture including at least ammonia and carbon dioxide with an aqueous solution including at least ammonium carbamate. Urea can be contained in the aqueous solution.

At least the portion of the first plate member 1a in contact with the urea synthesis mixture is formed of a high corrosion-resistant metal that has comparatively higher corrosion-resistance to the urea synthesis mixture than the second plate member 1b. The second plate member 1b is not in contact with the urea synthesis mixture, and is therefore formed of a low corrosion-resistant metal that has comparatively lower corrosion-resistance to the urea synthesis mixture than the first plate member 1a.

The first plate member 1a forms part of the reactor vessel, and is fixed to the remaining portion (reactor vessel body 2). The second plate member is detachably fixed to the reactor vessel body. The reactor vessel body 2 as mentioned here has a structure in which a cylindrical shell portion 2b and an end plate portion 2c are welded at a weld portion 2d, an inner surface portion 2a thereof is formed of high corrosion-resistant metal.

From the standpoint of corrosion-resistance reliability, the whole of the first plate member 1a is preferably made of a high corrosion-resistant metal, and more preferably, the first plate member 1a is one solid member obtained by rolling or forging the high corrosion-resistant metal. If a solid member cannot be obtained in a desired size, small solid members can be welded together to form a member having the desired size.

As a conventional manner, in case that a high corrosion-resistant metal layer is provided on a low corrosion-resistant metal (carbon steel or low alloy steel) of the pressure-resistant portion by overlay welding using a corrosion-resistant metal material, there is a possibility of welding defects such as cracks, porosity, slug inclusion, etc., occurring in the overlay layer itself or at the interface between the overlay layer and the pressure-resistant portion layer. However, if a solid member made by rolling or forging the high corrosion resistant mental is applied, there is no possibility of welding defects. Therefore, more reliable equipment in which possibility of material defects is extremely low can be achieved by using a solid member of a high corrosion-resistant metal for the first plate member 1a as described above.

As the high corrosion-resistant metal, a metal having a desired level of corrosion-resistance to the urea synthesis mixture can be used as appropriate. From the standpoint of corrosion resistance to a urea synthesis mixture and the like, high-chromium austenite steel such as 25Cr-22Ni-2Mo steel; a dual-phase alloy such as 25Cr-7Ni-3Mo steel; titanium; or 316L austenite steel is preferable.

As the low corrosion-resistant metal, a metal having a desired strength can be used as appropriate. From the standpoint of mechanical strength and cost, carbon steel; or a low alloy steel such as Mn—Mo steel or Cr—Mo steel is preferable.

The high chromium austenite steel is a steel that has roughly a 21 to 28 mass % of Cr, a 13 to 24 mass % of Ni and a 0.5 to 3 mass % of Mo. The dual phase alloy is a steel that has roughly a 24 to 30 mass % of Cr, a 5 to 10 mass % of Ni and a 0.5 to 4 mass % of Mo. The low alloy steel is a steel that has roughly a 0.5 to 10 mass % of Cr, a 0.4 to 1.2 mass % of Mo and a 0.2 to 2 mass % of Mn.

The thickness of the first plate member 1a can be set as appropriate so that the first plate member 1a alone (the state wherein the second plate member 1b is detached) can withstand the expected load such as the weight of the cooling tubes and the like excluding the load as a result of the pressure inside the reactor vessel during operation. The load as a result of the pressure inside the reactor vessel during operation can be supported mainly by the second plate member 1b. Therefore, the first plate member 1a can have a thin thickness which would not be able to withstand the load resulting from the operation pressure inside the reactor vessel. Although the thickness of the first plate member depends on conditions such as the diameter and length of the cooling tubes, it can be in a range of roughly 20 mm to 100 mm.

Figure 9:
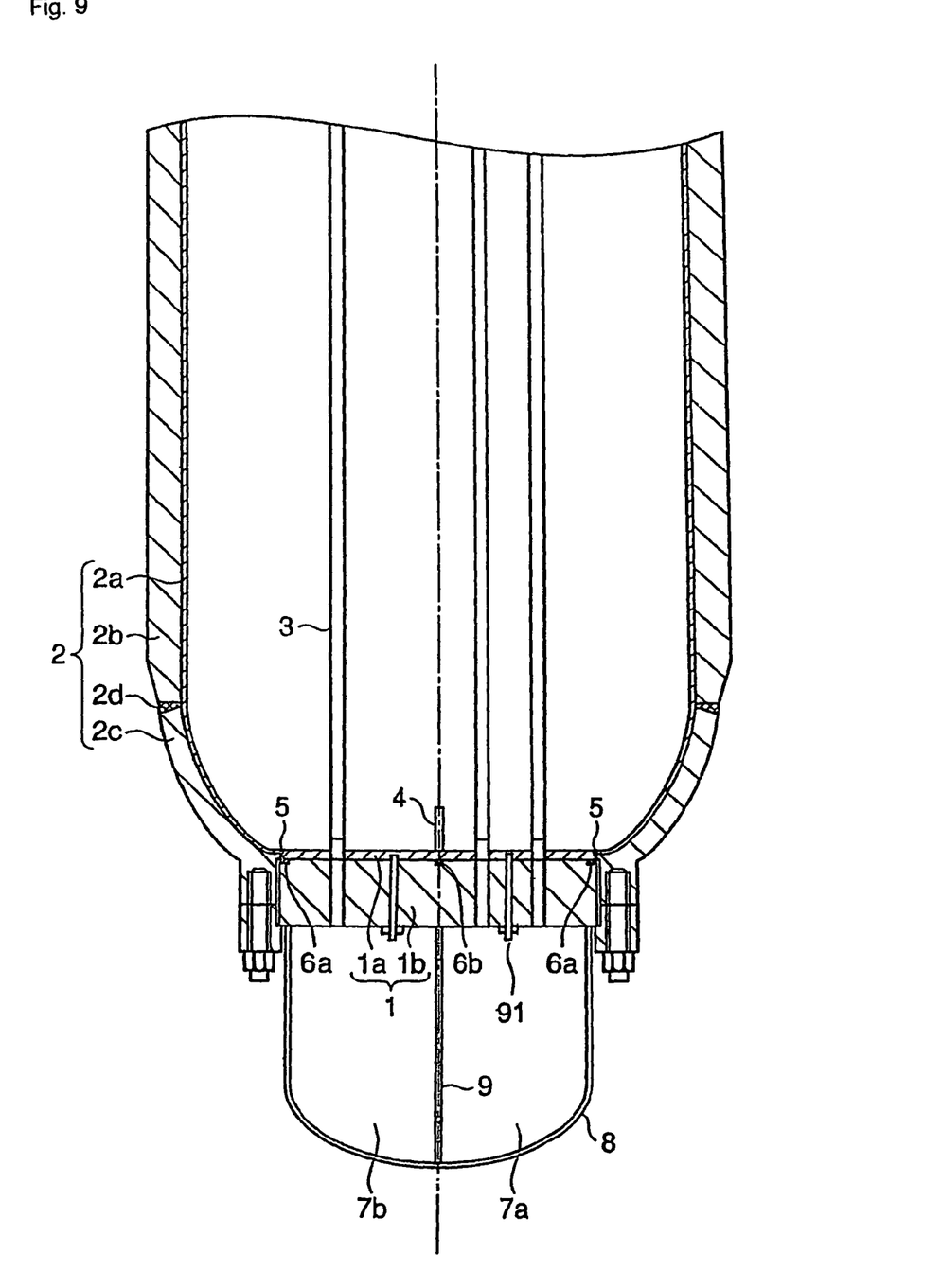
FIG. 9 is a schematic, cross-sectional view illustrating a part of a reactor having tie rods for supporting a first plate member.

To make the first plate member 1a thinner, a reinforcing beam 4 can be arranged on the first plate member 1a, in particular on the urea synthesis mixture side. The reinforcing beam 4 can be formed of the high corrosion-resistant metal and fixed to the first plate member 1a by welding. If there is a case that the reactor is operated with the channel side being pressurized while inside of the reactor vessel being not pressurized, upward load by channel side pressure may act on the first plate member 1a. In this case, tie rods 91 may be arranged as shown in FIG. 9, so that the first plate member 1a can be supported for the channel side operating pressure.

The second plate member 1b bears the load from internal pressure of the reactor vessel during operation via the first plate member 1a. Therefore, the second plate member 1b is arranged in contact with the back face (i.e. the face on the opposite side of the urea synthesis mixture) of the first plate member 1a. To minimize the load on the first plate member 1a, the second plate member 1b is preferably arranged in contact with as large a portion of the back face of the first plate member 1a as possible, and more preferably the second plate member 1b is arranged over the entire back face of the first plate member 1a.

Although thickness of the second plate member 1b depends on conditions such as the operating pressure, from a standpoint of strength, preferably it is thicker than the first plate member 1a, and can be in a range of roughly 100 mm to 800 mm.

The first plate member 1a is fixed by a weld to the reactor vessel body 2. The first plate member 1a and the reactor vessel body 2 define a zone for containing the urea synthesis mixture. In order to form the zone for containing the urea synthesis mixture by the high corrosion-resistant metal, the inner surface portion 2a of the reactor vessel body is formed of the high corrosion-resistant metal, and the portion which is in contact with the urea synthesis mixture of the first plate member 1a is also formed of the high corrosion-resistant metal, and these high corrosion-resistant metal portions are connected with each other at a weld portion 5 by a weld that is corrosion-resistant to the urea synthesis mixture.

Figure 2:
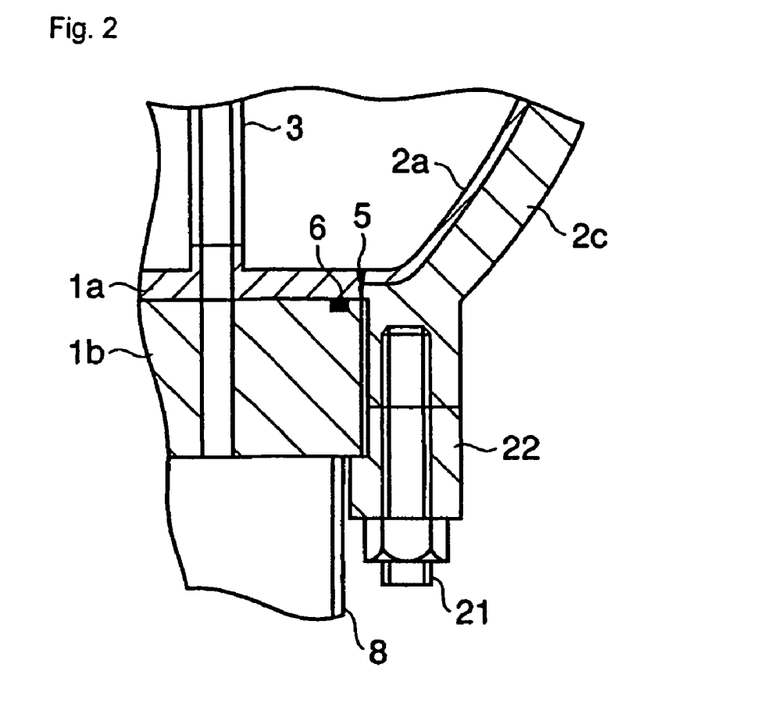
FIG. 2 is an enlarged, partial, cross-sectional view of an embodiment of a structure for fixing a second plate member.
Figure 3:
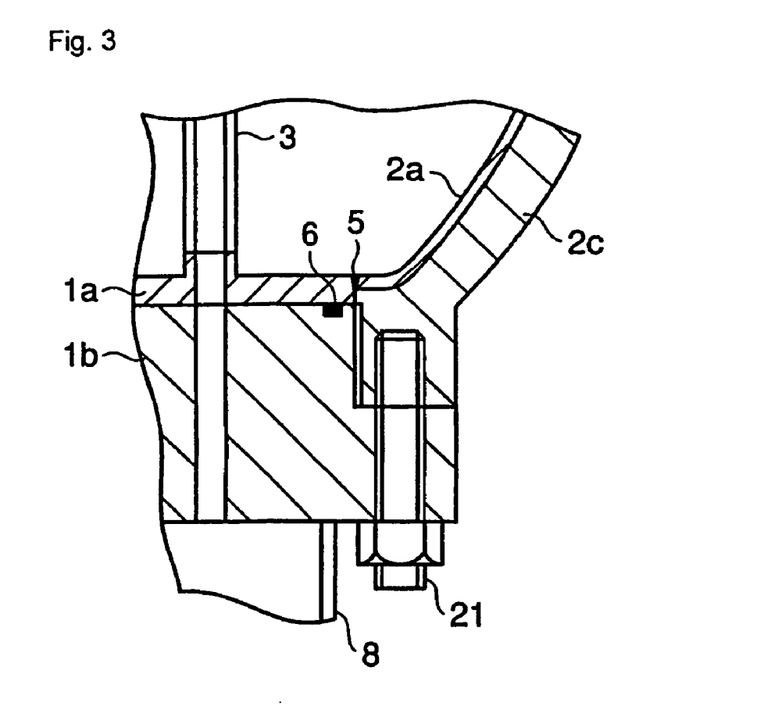
FIG. 3 is an enlarged, partial, cross-sectional view of another embodiment of a structure for fixing a second plate member.
Figure 4:
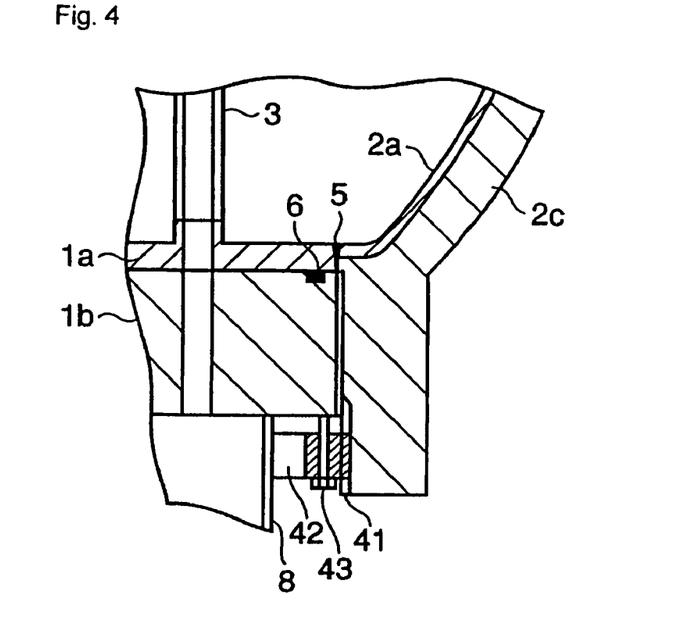
FIG. 4 is an enlarged, partial, cross-sectional view of an additional embodiment of a structure for fixing a second plate member.

The second plate member 1b is detachably fixed to the reactor vessel body 2. This fixing structure can be designed as appropriate. For example, as illustrated in FIG. 2, a ring-shaped member 22, which supports the second plate member 1b, is fixed to the reactor vessel body 2 (here, an end plate 2c) by bolts 21. Or, as illustrated in FIG. 3, a structure that combines the ring member with the second plate member 1b is employed, and this second plate member 1b is fixed to the reactor vessel body 2 using a bolt 21. Alternatively, as illustrated in FIG. 4, the second plate member 1b is fixed to the reactor vessel body 2 using a breach lock structure. That is, a portion which fits the second plate member 1b is arranged on the reactor vessel body, a tread portion 41 is arranged on an inner surface thereof, and once the second plate member 1b has been set, a ring 42 having a thread which fits the tread portion 41 at its outer circumference is screwed in, and the second plate member is supported by bolts 43 that is provided on the ring 42.

For the cooling tubes 3, at least a portion in contact with the urea synthesis mixture is a high corrosion-resistant metal. Because the tube wall thickness is relatively thin, in practical terms it is preferable for the entire cooling tube 3 to consist of a high corrosion-resistant metal.

The cooling tube 3 is welded to the first plate member 1a. In particular, the cooling tube 3 is welded to the high corrosion-resistant metal portion of the first plate member 1a. The weld between the cooling tube 3 and the first plate member 1a is preferably an inner bore weld from the standpoint of obtaining a full-penetration weld for the welded portion. Other welding methods can be employed as long as a full-penetration weld can be assured. Inner bore weld is a welding method in which the welding torch is inserted inside the tube, and the tube and the tubesheet are butt-welded from their inner sides.

According to the above-described structure, the following advantages can be achieved.

The weld for attaching the tube to the tubesheet is easy to perform and a highly reliable weld joint can be achieved.

The weld for attaching the tube 3 to the tubesheet 1 is performed with the second plate member 1b detached, so that the distance from the tube side (channel side) face of the tubesheet to the weld portion is extremely close, for example, several tens of mm, as compared with the conventional art in which the distance can be as much as several hundred mm. Therefore, weld control is easy and a highly reliable weld joint can be achieved more easily.

Figure 5:
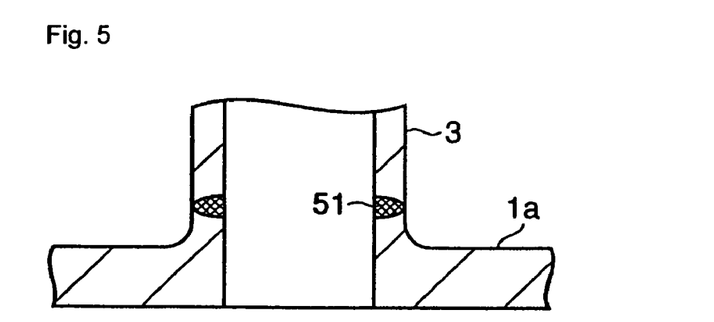
FIG. 5 is an enlarged, partial, cross-sectional view of an embodiment of a structure for fixing a tube to a first plate member.
Figure 6:
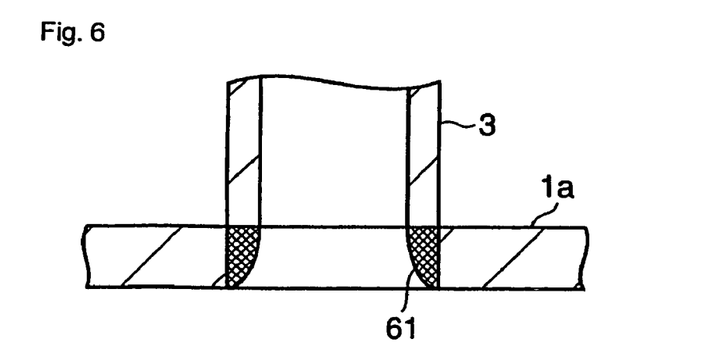
FIG. 6 is an enlarged, partial, cross-sectional view of another embodiment of a structure for fixing a tube to a first plate member.

Further, because the weld portion is near, and because the portion made of a high corrosion-resistant metal is not expected to serve as a strengthening member and thus larger tube hole can be applicable, it is not necessary to use the inner bore weld in butted manner, and it is possible to employ a fillet weld joint. FIG. 5 illustrates the weld portion 51 between a tube 3 and a first plate member 1a welded by inner bore welding. FIG. 6 illustrates a weld portion 61 performed by fillet welding. The tube hole arranged on the first plate member 1a is larger for the case illustrated in FIG. 6 than that illustrated in FIG. 5.

It is easy to deal with problems, such as welding defects, during fabrication of the reactor.

During fabrication, once a tube array has been welded, even if a defect is found in a tube weld portion of an already-welded portion, and the defect has to be repaired from the tube interior side, because the distance from the tube side face of the tubesheet 1 to the weld portion is close, the defect can be repaired more easily. Depending on the situation, after attaching the tube to the first plate member 1a by an inner bore weld, it is possible to repair the bore weld joint by changing it to a fillet weld joint.

Maintenance of the weld portion which attaches the tube to the tubesheet is easy even after starting operation of the reactor.

It is easier to deal with welding defects, which are hidden in the weld portion of the tube and the tubesheet or in the tube itself, and which becomes apparent after starting operation as a result of the corrosion that occurs during operation.

It is possible to deal with such welding defects by removing the second plate member 1b, which is the main pressure-resistant member, and allowing the high corrosion-resistant metal portion to be exposed. If repair work is necessary on the weld portion between the tube 3 and the tubesheet 1, this can be carried out at very close distance. In cases where the tube was originally attached by an inner bore weld, if repairing using an inner bore weld is difficult, it is possible to repair the weld joint changing it to a fillet weld joint. Even if a leak develops in the tube itself and it is necessary to conduct plug welding on the tubesheet face, because the portion made of high corrosion-resistant metal can be exposed, the welding is very easy.

Even should the second plate member 1b be heavily damaged by corrosion of a urea synthesis mixture leak through to the tube side during operation, this might be dealt with by removing the second plate member 1b from the reactor vessel body and carrying out welding repair work, or replacing it in its entirety.

Cooling medium, which is supplied to an inlet channel 7a from a not-shown inlet, passes from tube holes of the tubesheet 1 through inverted U-shaped cooling tubes 3, then passes out of the tube holes of the tubesheet 1 and gathers at an outlet-side channel 7b, and is then discharged to outside of the apparatus from a not-shown outlet. Although only part of the tubes are shown in the drawings, in practice a plurality of tubes are provided, and in many cases this number can be as much as several hundred tubes. The above-described channels are formed by a cover 8 and a partition plate 9 for partitioning the inside of the cover. The cover can be made relatively thin, because it is enough for the cover to withstand the pressure from the cooling medium.

Water can be employed as the cooling medium. When the reactor interior is cooled using water, because the water itself is heated, this heat is preferably utilized as a heat for generating steam.

In order to excellently seal the tube-side fluid (i.e. cooling medium), a gasket 6 can be provided between the first plate member 1a and the second plate member 1b. For example, a ring-shaped gasket 6a can be provided on an inner side from the circumference of circular first and second plate members along the circumference, and further, as a seal between the cooling medium inlet-side and outlet-side, a gasket 6b can be provided in a center portion of the ring-shaped gasket extending in a diameter-direction thereof, which is connected with the ring-shaped gasket at two places. Since this gasket is arranged in a position which is not in contact with the urea synthesis mixture, it is enough for the gasket to be made of a material which withstands the cooling medium such as water. Therefore, the gasket can be selected from well-known O-rings or the like as appropriate.

For other constituent parts or elements of a urea synthesis reactor than described above, there can be employed those of well-known urea synthesis reactor capable of reacting ammonia and carbon dioxide to obtain a urea synthesis mixture and equipped with cooling tubes, so called urea condensation and synthesis reactor, as appropriate.

Figure 7:
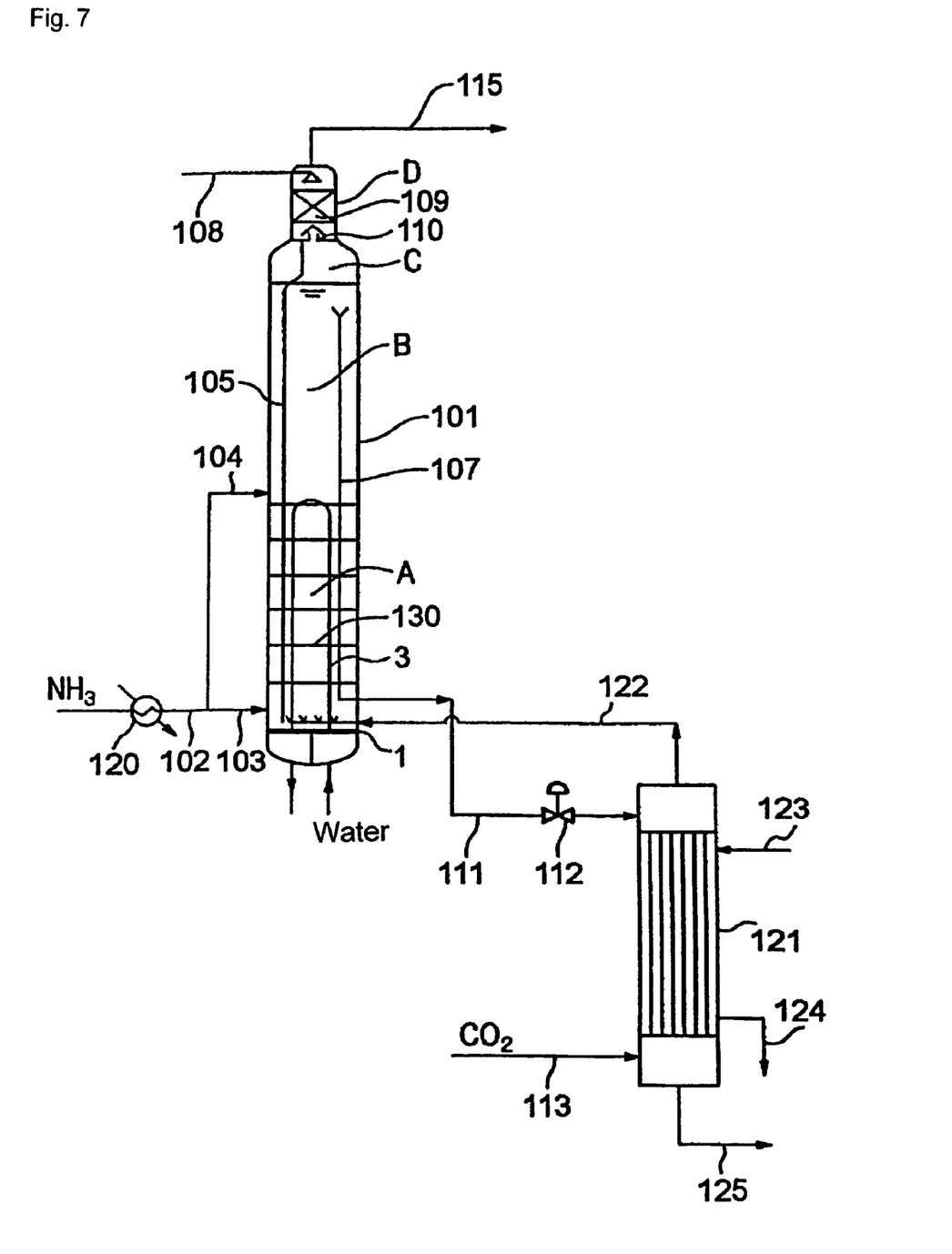
FIG. 7 is a schematic, diagram for explaining a urea synthesis process.

An example of urea synthesis will now be explained in detail with reference to FIG. 7. Feedstock liquid ammonia that has been pre-heated by a pre-heater 120 supplied from a line 102 is introduced into the bottom portion and middle portion of a vertical condensation and synthesis reactor 101 via line 103 and line 104, respectively. A gas mixture of ammonia, carbon dioxide and water that has been separated at a stripper 121 is introduced into the bottom portion of the vertical condensation and synthesis reactor 101 via a line 122. A bubbling device for bubbling the gas in the liquid inside the reactor is provided at the opening of the line 122 into the condensation and synthesis reactor. Bubbling has the effect of stirring the reactor interior, which is preferable from a standpoint of promoting the reaction. The bubbling device can be designed by employing a well-known technique for bubbling gas in solution. Further, a below-described absorbing medium is introduced into the reactor via a line 105.

The condensation portion A (the portion extending from the bottom portion to the middle portion) of the vertical condensation and synthesis reactor 101 is provided with cooling tubes 3. From the standpoint of preventing the tubes from being constrained by thermal expansion of the tubes, a tube bundle of inverted U-tubes is preferably used as the cooling tubes. The cooling tubes 3 are fixed to the tubesheet 1. As described above, this tubesheet has a first plate member 1a and a second plate member 1b, as described in the above embodiments. Water is passed through the cooling tubes 3 as a coolant, and the heat of formation of ammonium carbamate generated in the cooling portion A can be recovered by converting the water in the U-tubes to steam. The ammonium carbamate produced therein rises through the condensation portion A into a synthesis portion B (the portion extending from the middle portion to the liquid surface of the top portion) of the vertical condensation and synthesis reactor 101 along with uncondensed ammonia and carbon dioxide.

The condensed liquid introduced in the synthesis portion B from the condensation portion A of the vertical condensation and synthesis reactor 101 is mixed with the feedstock liquid ammonia introduced through a line 104, thereby ammonium carbamate is produced from the uncondensed ammonia and carbon dioxide, and the heat of formation thereof is used to provide the required heat for the endothermic reaction which converts ammonium carbamate to urea, and thus, the urea synthesis reaction proceeds.

In the top portion of the synthesis portion B of the vertical condensation and synthesis reactor 101, there is an opening of the upper end of a line 107, which is provided preferably inside the vertical condensation and synthesis reactor, in order to allow the urea synthesis mixture produced in the condensation and synthesis reactor to flow into a stripper 121. A liquid surface is formed above the opening of the line 107. The portion above the liquid surface is a gas-liquid separation portion C, which performs the function of separating inert gases (hydrogen and nitrogen contained in the feedstock carbon dioxide as well as air introduced in order to prevent the corrosion of reactor) and accompanying ammonia and carbon dioxide from the urea synthesis mixture.

The topmost portion of the vertical condensation and synthesis reactor 101 is provided with a scrubbing portion D having the function of washing the gas separated in the liquid-gas separation portion C and absorbing the ammonia and carbon dioxide in the gas with an absorbing medium. The absorbing medium can be a recovered liquid (described later) containing the ammonium carbamate obtained by recovering the unreacted ammonia and carbon dioxide in the urea solution from the stripper, which is introduced into the top part of the scrubbing portion D via a line 108. The introduced absorbing medium contacts with the gas rising from the liquid-gas separation portion C in a packed bed 109, absorbs a part of ammonia and carbon dioxide therein, and flows down to the bottom of the vertical condensation and synthesis reactor 101 through a line 105, which has an opening in a chimney portion 110. The line 105 is preferably provided inside the vertical condensation and synthesis reactor 101, but can be provided outside the vertical condensation and synthesis reactor 101.

Preferably, at least the condensation portion A of the vertical condensation and synthesis reactor 101 can be provided with a baffle plate 130 to improve gas-liquid contact. The baffle plate can be selected from a variety of known baffle plates.

The unabsorbed gas containing ammonia and carbon dioxide that is discharged from a line 115 connected to the top of the scrubbing portion D is washed by water in order to recover the ammonia and carbon dioxide.

The urea synthesis mixture flowing down through line 107 from the top portion of the synthesis portion B of the vertical condensation and synthesis reactor 101 is introduced into the top portion of the stripper 121 via a line 111 and a controlling valve 112. The introduced urea synthesis mixture flows down through a heated tubes in the stripper 121 (steam is introduced from a line 123 and condensate is discharged from a line 124) and contacts the feedstock carbon dioxide introduced into the bottom portion of the stripper 121 through a line 113. Thereby most of the unreacted ammonia and carbon dioxide are separated from the urea synthesis mixture, and are then supplied as a gas mixture mixed with the feedstock carbon dioxide to the bottom portion of the vertical condensation and synthesis reactor 101 through a line 122.

The liquid containing urea and the unreacted ammonia and carbon dioxide is withdrawn from the bottom portion of the stripper, and transferred through a line 125 to a low pressure decomposition step, and processed to provide urea. The unreacted ammonia and carbon dioxide are absorbed by water, dilute aqueous ammonia or the like, to provide a recovered liquid. This recovered liquid can be supplied as an absorbing medium to the scrubbing portion D of the vertical condensation and synthesis reactor 101, as described above.

While the present invention has been explained in detail using the example of a vertical urea condensation and synthesis reactor, the reactor according to the present invention can also be a horizontal urea condensation and synthesis reactor. Further, while in this urea condensation and synthesis reactor cooling tubes for flowing a cooling medium are provided to cool the urea synthesis mixture, the present invention can also be applied in cases where heating tubes are provided for flowing a heating medium in place of the cooling tubes. Still further, the present invention is not limited to a urea synthesis reactor, and can be applied to a reactor for carrying out a reaction other than urea synthesis reaction. In particular, the present invention can be suitably applied in a reactor which employs a tubesheet constituted from a material having relatively high corrosion-resistance to the reaction solution and a material having relatively low corrosion-resistance to the reaction solution.

The reactor according to the present invention can be preferably employed over a broad range of reactions where the reaction is carried out under relatively high pressure and the corrosiveness of the reaction fluid is relatively high, for example urea synthesis.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention can be practiced otherwise than as specifically described herein.

What is claimed is:

1. A reactor comprising:
    a reactor vessel including a tubesheet and configured to receive a reaction fluid, the tubesheet has a first plate member configured to contact the reaction fluid and a second plate member configured to not contact the reaction fluid; and
    heat exchange tubes provided in the reactor vessel and fixed to the first plate member, the heat exchange tubes being configured to receive a heat exchange medium,
    wherein at least a portion of the first plate member configured to contact the reaction fluid is made of a high corrosion-resistant metal that has a higher corrosion-resistance against the reaction fluid,
    wherein the second plate member is made of a low corrosion-resistant metal that has a lower corrosion-resistance against the reaction fluid, wherein the heat exchange tubes do not pass through the second plate member, and
    means for detachably assembling the second plate member to a remainder of the reactor vessel including the first plate member.

2. The reactor according to claim 1, wherein the heat exchange tubes are fixed by a weld to the first plate member, and wherein the first plate member is fixed by a weld to the remainder of the reactor vessel.

3. The reactor according to claim 1, wherein the reactor is configured to obtain a urea synthesis mixture by reacting ammonia and carbon dioxide, wherein the reactor vessel is configured to receive a urea synthesis mixture as the reaction fluid, and wherein the heat exchange tubes are configured to receive a cooling medium as the heat exchange medium.

4. The reactor according to claim 2, wherein the reactor is configured to obtain a urea synthesis mixture by reacting ammonia and carbon dioxide, wherein the reactor vessel is configured to receive a urea synthesis mixture as the reaction fluid, and wherein the heat exchange tubes are configured to receive a cooling medium as the heat exchange medium.

5. The reactor according to claim 1, wherein the high corrosion-resistant metal is a high-chromium austenite steel, a dual-phase alloy, titanium, or 316L austenite steel.

6. The reactor according to claim 4, wherein the high corrosion-resistant metal is a high-chromium austenite steel, a dual-phase alloy, titanium, or 316L austenite steel.

7. The reactor according to claim 1, wherein the low corrosion-resistant metal is carbon steel or low-alloy steel.

8. The reactor according to claim 6, wherein the low corrosion-resistant metal is carbon steel or low-alloy steel.

9. The reactor according to claim 1, wherein the first plate member consists of the high corrosion-resistant metal.

10. The reactor according to claim 8, wherein the first plate member consists of the high corrosion-resistant metal.

11. The reactor according to claim 1, wherein the second plate member is thicker than the first plate member.

12. The reactor according to claim 10, wherein the second plate member is thicker than the first plate member.

13. The reactor according to claim 1, wherein the heat exchange tubes are welded to the first plate member by an inner bore weld.

14. The reactor according to claim 12, wherein the heat exchange tubes are welded to the first plate member by an inner bore weld.

15. The reactor according to claim 1, further comprising a gasket provided between the first plate member and the second plate member.

16. The reactor according to claim 1, wherein the means for detachably assembling comprises a bolt.

17. The reactor according to claim 1, wherein the means for detachably assembling comprises a breach lock.

* * * * *